United States Patent [19]
Capion

[11] Patent Number: 4,797,588
[45] Date of Patent: Jan. 10, 1989

[54] STATOR COOLING FOR DYNAMOELECTRIC MACHINE

[75] Inventor: Robert L. Capion, Ridott, Ill.

[73] Assignee: Sundstrand Corporation, Rockford, Ill.

[21] Appl. No.: 132,878

[22] Filed: Dec. 14, 1987

[51] Int. Cl.⁴ .......................... H02K 9/00; H02K 3/46
[52] U.S. Cl. ........................................ 310/54; 310/57; 310/64; 310/260
[58] Field of Search ............... 310/156, 260, 270, 262, 310/52, 54, 57, 58, 64, 65

[56] References Cited

U.S. PATENT DOCUMENTS

| | | | |
|---|---|---|---|
| 2,844,745 | 7/1958 | Hamm | 310/57 |
| 3,109,947 | 11/1963 | Thompson et al. | 310/64 |
| 4,318,021 | 3/1982 | Johansson et al. | 310/260 |
| 4,413,201 | 11/1983 | Nikitin et al. | 310/260 |
| 4,598,223 | 7/1986 | Glennon et al. | 310/260 |
| 4,618,795 | 10/1986 | Cooper et al. | 310/260 |
| 4,621,212 | 11/1986 | Torossian | 310/260 |
| 4,729,160 | 3/1988 | Brown | 310/156 |

Primary Examiner—Mark O. Budd
Attorney, Agent, or Firm—Wood, Dalton, Phillips, Mason & Rowe

[57] ABSTRACT

Inefficiencies in heat exchange between the end turns 20 of a dynamoelectric machine including a stator 10 and coolant carrying tubing 22 wrapped about the end turns 20 as a result of thermal growth of the end turns 20 may be avoided through the use of a retainer 28 for the tubing 22 and having a coefficient of thermal expansion that is substantially less than the coefficient of thermal expansion of the end turns 20.

15 Claims, 1 Drawing Sheet

STATOR COOLING FOR DYNAMOELECTRIC MACHINE

FIELD OF THE INVENTION

This invention relates to dynamoelectric machines such as motors or generators, and more specifically, to the cooling of end turns of the stator used in such machines.

BACKGROUND OF THE INVENTION

The operation of dynamoelectric machinens, whether as motors or generators, is always accompanied by the generation of heat in the machine's varius components, including the stator. In order to prevent damage to the machine, such heat must be conducted away from the machine components; and so a variety of cooling schemes have been proposed for doing just that.

When a dynamoelectric machine is to operate in environments wherein a high power to weight ratio is desirable as, for example, in aircraft, the cooling means must be highly efficient and reject large quantities of heat in very short periods of time so that both the rotor and the stator may be made relatively small to minimize their weight.

One highly efficient means of rejecting heat from the stators of dynamoelectric machines may be employed in addition to conventional back iron cooling or, in many instances, without back iron cooling. It involves cooling the end turns, that is, that part of the stator winding that projects beyond the opposite sides of the stator core, by flowing a coolant through tubing in heat exchange relation with the end turns. Heat originating within the stator itself is conducted via the end turns to the coolant tubes whereat it is rejected and in many instances, such a system may eliminate any need for back iron cooling. Of course, if back iron cooling is employed, the system becomes all the more efficient in rejecting heat.

In any event, examples of this approach may be seen in U.S. Pat. No. 2,844,745 issued July 22, 1958 to Hamm and U.S. Pat. No. 3,109,947 issued Nov. 5, 1963 to Thompson et al. While the approaches illustrated in those patents are theoretically practical, the efficiency of heat removal can be increased if the heat transfer interfaces are held in contact with each other, particularly where the dynamoelectric machine must operate over a wide temperature range.

In particular, operation of a dynamoelectric machine over a wide temperature range will result in significant thermal growth of the various parts. Thus, is the coolant tubes of, for example, Hamm are expanded in the radial direction as the result of thermal growth, the heat transfer interface may become unbonded or permanently deformed. As the end turns begin to cool down for any of a variety of reasons, they may pull away from the coolant conduit and good heat exchange contact will be lost. As a result, the cooling efficiency of the system becomes diminished.

Furthermore, the relative movement between the end turns and the coolant conduit as a result of thermal growth can result in so-called "fretting" at the interface between the two components. Such fretting may wear through the insulating varnish or the like applied to the end turns. The problem is particularly severe where the conduits are formed of metal since fretting could result in the conduit's coming in contact with exposed conductors where the insulation on the end turns has worn away as a result of substantial fretting. This, of course, will result in an electrical short circuit of the dynamoelectric machine. If the conduits are formed of elastomer, excessive heat can cause deterioration thereof.

The present invention is directed to overcoming one or more of the above problems.

SUMMARY OF THE INVENTION

It is the principal object of the invention to provide a new and improved dynamoelectric machine. More specifically, it is an object of the invention to provide a dynamoelectric machine wherein a coolant conduit is disposed about the end turns of the stator and will be maintained in good heat exchange relation therewith throughout the useful life of the machine.

According to one facet of the invention, there is provided a dynamoelectric machine including a stator having opposed ends, a rotor-receiving opening in the stator and extending between the opposed ends or sides, an electrical winding in the stator and about the opening and including end turns extending generally axially from the sides. A circumferential cooling conduit is disposed in heat exchange relation with the end turns on the radially outer side thereof. A circumferential retainer radially outwardly of the conduit is provided according to the invention for holding the conduit in the desired heat exchange relation. The retainer has a coefficient of thermal expansion that is substantially less than the coefficient of thermal expansion of the conduit and the end turns. Thus, the conduit is constantly held in good heat exchange contact with the end turns.

According to another facet of the invention, there is provided a stator with a rotor-receiving opening and electrical windings including end turns as before. Also provided is a circumferential cooling conduit in heat exchange relation with the end turns on the radially outer side thereof and the conduit has a thin, pleated or accordion-like sidewall to accommodate thermal growth of the end turns.

Usually, but not always, the conduit will comprise helically wound tubes on both sides of the stator.

In a preferred embodiment, the sides of the tubes are concave so that even though they be in substantial abutment with adjacent convolutions, upon compression of the tubes as a result of thermal growth of the end turns, the tubes will not expand axially to compressingly engage adjacent convolutions and put pressure on the same.

In a highly preferred embodiment, the retainer is made of a material that has a negligible coefficient of thermal expension. Typical of such a material is a composite material which preferably may comprise wound filament in a resinous matrix.

In a highly preferred embodiment, the tubes have a cross section that is somewhat hourglass shaped.

The invention contemplates that a layer of antifriction material be disposed between the tubes in the end turns so that relative movement due to thermal growth may occur between the tubes and the end turns without causing fretting of the tubes and/or the end turns.

In a highly preferred embodiment, where the tubes are formed of metal, the antifriction material is also an electrical, but not a thermal, insulator.

Other objects and advantages will become apparent from the following specification taken in connection with the accompanying drawings.

DESCRIPTION OF THE PREFERRED EMBODIMENT

Figure 1:
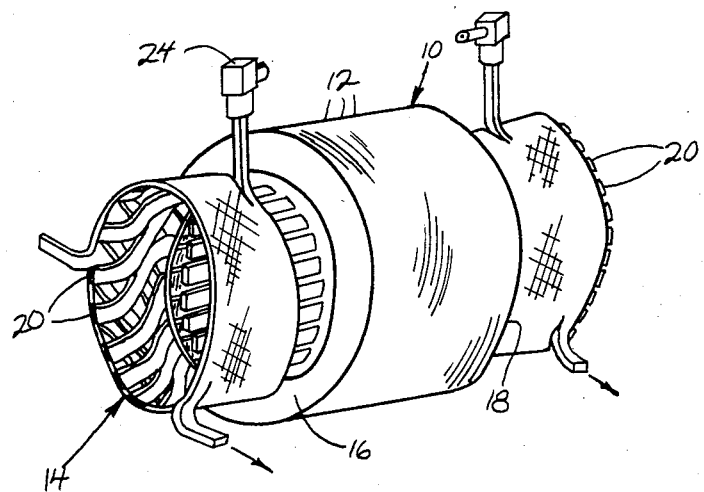
FIG. 1 is a perspective view of a stator of a dynamoelectric machine made according to the invention.

An exemplary embodiment of a dynamolectric machine made according to the invention is illustrated in the drawings. It will be understood that the same could be either a motor or a generator as desired. In any event, the same includes a stator, generally designated 10. The stator may be composed of a plurality of soft iron laminations 12 as is well known to define a stator core. The resulting stator core will include a rotor receiving opening, generally designated 14, which extends from one side 16 to the other 18 of the stator 10.

Figure 2:
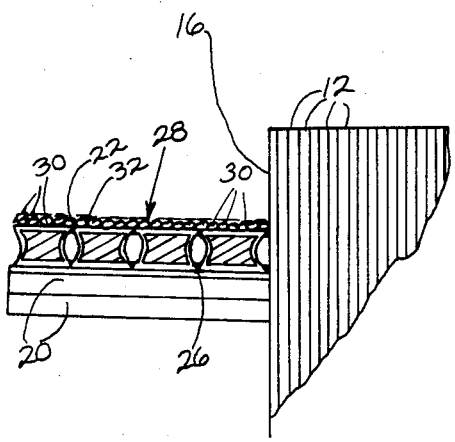
FIG. 2 is an enlarged, fragmentary view of part of the end turns of the dynamoelectric machine with parts shown in section for clarity.

As is well known, the stator 10 carries one or more windings that are located about the rotor-receiving opening 14 and which include end turns 20 that extend from respective sides 16 and 18 of the stator core in a generally axial direction. The end turns 20 will frequently be copper since copper is an excellent electrical conductor. It is an excelent thermal conductor as well and thus, on the radially outer side of the end turns 20, the invention contemplates the provision of a coolant conduit in the form of tubes 22 wound helically about the end turns 20 such that adjacent convolutions of the tubes 22 are in substantial abutment as can be seen from FIGS. 2 and 3. The tubes 22 are applied to the end turns 20 on both the side 16 and the side 18 of the stator 10 and the ends of the tubes 22 may be provided with fittings such a those shown at 24 for connection to a pump (not shown) or the like that circulates coolant through the tubes 22.

In a preferred embodiment, a thin layer 26 of material is disposed on the radially outer side of the end turns 20 before the tubes 22 are applied thereto. The layer 26 is an antifriction layer which is designed to allow relative movement between the tubes 22 and the end turns 20 with a minimum of friction so as to eliminate fretting at the interface of the tubes 22 and the end turns 20. At the same time, the material will be sufficiently thin and of relatively good thermal conductivity so it will not impede heat transfer from the end turns 20 the the tubes 22.

Frequently, but not always, the tubes 22 will be formed of a metallic material such as aluminum. Even though the ends turns 20 will typically be insulated as, for example, with a layer of varnish (not shown), when the tubes 22 are metal, it is desirable that the layer 26 be formed of a material which additionally is an electrical insulator.

A retainer, generally designated 28 is applied to the radially outer side of the wrap of the tubes 22. The retainer 28 will be formed of a material that has a coefficient of thermal expansion that is substantially lower than the coefficient of thermal expansion of either the material of which the tubes 22 are formed or the material of which the end turns 20 are formed.

In a highly preferred embodiment, the coefficient of thermal expansion of the retainer 28 will be virtually nil and this can be achieved by using a composite material in forming the retainer.

Filaments 30, such as graphite filaments, may be wrapped against the radially outer surface of the tubing 22 and captured in a matrix 32 of resinous material.

Figure 3:
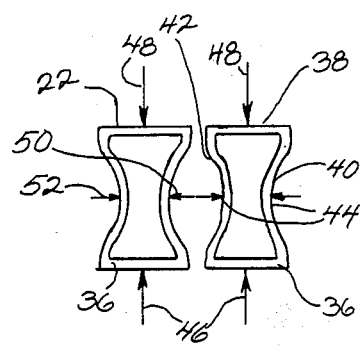
FIG. 3 is a fragmentary sectional view of two adjacent convolutions of a coolant conduit employed in the invention.

In a preferred embodiment, the tubes 22, in addition to being metal, have hourglass-shaped cross sections as in perhaps seen best in FIG. 3. That is to say, they have a relatively wide radially inner base 36, a relatively wide radially outer base 38 and side walls 40 and 42 which neck in at their mid points 44. Stated another way, the side walls 40 and 42 of the tube 28 are concave, or pleated, or bellows-like, or accordion-like, etc. The purpose of this construction is to provide the tubing 22 with the ability to accommodate thermal expansion of the end turns 20. As a thermal growth force is applied against the inner base 36 of the tubing 22 as indicated by arrows 46, the same will be resisted by the resisting force applied by the retainer 28 as illustrated by arrows 48. A catastrophic collapse of the tubes 22 will not result because the side walls 40 and 42 of each convolution are free to resiliently flex and move toward each other in the direction of arrows 50 and 52. When the growth force 46 is relieved the inherent resiliency of the tube convolutions 22 will cause the individual convolution to restore to their original configuration.

It is to be particularly observed that the use of concave side walls 40 and 42 is highly desirable compared to the use of convex side walls. The use of concave side walls allows the adjacent convolutions of the tubes 22 to be put in substantial abutment with one another without fear that one convolution will collapse or axially move an adjacent convolution as a result of axial expansion of side walls of the tubes 22 as would be the case if the tubes 22 were convex rather than concave. Stated another way, the use of concave side walls allows an increase in the number of convolutions that may be applied to end turns 20 of given axial length thereby increasing the area over which heat transfer occurs and thus increasing the rate of heat transfer.

In this connection, it is particularly noted that the desired, somewhat hourglass-shaped cross section of the tubes 22 are highly desirably in that it provides relatively flat inner bases 36 into the tube which optimizes the heat transfer interfaces with the end turns 20. The system also allows internal pressure applied within the tubes 22 to bring the inner bases 36 into good heat exchange contact with the end turns 20, particularly where the tubes are relatively thin walled as desired. Thus, in some instances, this feature may allow good efficient operation of the cooling system without the need for the retainer 28.

It should also be noted that if desired, a single convolution of an extremely wide tube could be utilized but it is generally more desirable to employ plural convolutions since that provides for some greater degree of compensation in manufacturing tolerances and/or operational differences along the length of the end turns. In other words, the ends turns may not present a surface that is truly cylindrical or frustoconical and the use of plural convolutions of relatively narrow tubing can compensate for these differences more aptly than a wider tubing.

If desired, the means of the invention can also be employed in back iron cooling simply by winding the tubes on the periphery of the laminations 12 and retaining the same thereon with the composite.

I claim:

1. A dynamoelectric machine including:
   a stator having opposed sides;
   a rotor-receiving opening in said stator and extending between said sides;
   an electrical winding on said stator about said opening and including end turns extending generally axially from said sides;
   a circumferentially coolant conduit in heat exchange relation with said end turns on the radially outer side thereof; and
   a circumferential retainer radially outwardly of said conduit for holding said conduit in said heat exchange relation, said retainer having a coefficient of thermal expansion that is substantially less than the coefficients of thermal expansion of said conduit and said end turns.

2. The dynamoelectric machine of claim 1 wherein said conduit comprises a pair of helically wound tubes, one at each side of said stator.

3. The dynamoelectric machine of claim 2 wherein said retainer is a composite.

4. The dynamoelectric machine of claim 3 wherein said retainer comprises wound filament in a resinous matrix.

5. A dynamoelectric machine including:
   a stator having opposed sides;
   a rotor-receiving opening in said stator and extending between said sides;
   an electrical winding on said stator about said opening and including end turns extending generally axially from said sides;
   a circumferentially coolant conduit in heat exchange relation with said end turns on the radially outer said thereof; and
   a circumferential retainer radially outwardly of said conduit for holding said conduit in said heat exchange relation;
   said conduit having a thin, pleated or accordion-like side wall to accommodate thermal growth and/or shape variations of said end turns.

6. The dynamoelectric machine of claim 5 wherein said conduit is a helical tube with adjacent convolutions in substantial abutment, and said side wall is concave so that said side wall is not flexed axially into the adjacent convolution as thermal growth is encountered.

7. The dynamoelectric machine of claim 6 wherein said tube has a cross section that is generally hourglass shaped.

8. The dynamoelectric machine of claim 7 wherein said retainer is a filament wound about said conduit in a resinous matrix.

9. A dynamoelectric machine including:
   a stator having opposed sides;
   a rotor receiving opening in said stator and extending between said sides;
   an electrical winding on said stator about said opening and including end turns extending generally axially from said sides;
   a circumferentaiily coolant conduit in heat exchange relation with said end turns on the radially outer side thereof; and
   a circumferential retainer radially outwardly of said conduit for holding said conduit in said heat exchange relation, said retainer having a coefficient of thermal expansion that is substantially less than the coefficients of thermal expansion of said conduit and said end turns;
   said conduit being helically wound tubes on both of said sides of said stator with said tubes having concave side wall allow compression thereof in the radial direction without expansion thereof in the axial direction.

10. The dynamoelectric machine of claim 9 wherein a thin layer of antifriction material is disposed between said tubes and said end turns so that relative movement due to thermal growth may occur between said tubes and said end turns without causing fretting of said tubes and/or said end turns.

11. The dynamoelectric machine of claim 10 wherein said tubes are formed of a metal and said antifriction material is also an electrical, but not thermal, insulator.

12. The dynamoelectric machine of claim 9 wherein said retainer is would filament in a resin matrix.

13. The dynamoelectric machine including:
   a stator having opposed sides, a rotor receiving opening and extending between said sides, and an electrical winding on said stator about said opening and including end turns extending generally axially from said sides;
   a circumferential coolant conduit in heat exchange relation with said stator on the radially outer side thereof; and
   a circumferential retainer radially outwardly of said conduit for holding said conduit in heat exchange relation, said retainer having a cofficient of thermal expansion that is substantially less than that of said stator end turns.

14. The dynamoelectric machine of claim 13 wherein said conduit is on said end turns.

15. The dynamoelectric machine of claim 13 wherein said conduit comprises a helically wound tube and said retainer comprises a composite.

* * * * *